United States Patent [19]

Seragnoli et al.

[11] Patent Number: 4,565,202
[45] Date of Patent: Jan. 21, 1986

[54] METHOD AND APPARATUS FOR FORMING PERFORATION IN BAR-SHAPE ARTICLES

[75] Inventors: Enzo Seragnoli; Riccardo Mattei, both of Bologna, Italy

[73] Assignee: G.D Societa' per Azioni, Bologna, Italy

[21] Appl. No.: 484,425

[22] Filed: Apr. 12, 1983

[30] Foreign Application Priority Data

May 3, 1982 [IT] Italy ................ 48326 A/82

[51] Int. Cl.$^4$ .................... A24C 5/60; B23K 27/00
[52] U.S. Cl. .................... 131/281; 131/285; 219/121 LK; 219/121 LL; 219/121 LQ; 219/121 LR; 219/121 LS; 219/121 LT; 219/121 LU; 219/121 LV; 219/121 LY
[58] Field of Search ............... 131/285, 281; 219/121 LK, 121 LL, 121 LQ, 121 LR, 121 LS, 121 LT, 121 LU, 121 LV, 121 LY, 121 LZ, 121 LM

[56] References Cited

U.S. PATENT DOCUMENTS

| | | | |
|---|---|---|---|
| 3,960,073 | 6/1976 | Rush | 101/40 |
| 3,996,851 | 12/1976 | Urban | 101/40 |
| 4,224,498 | 9/1980 | Grollimund et al. | 219/121 L |
| 4,265,254 | 5/1981 | Koch et al. | 219/121 LK |
| 4,281,670 | 8/1981 | Heitmann et al. | 131/281 |

*Primary Examiner*—V. Millin
*Assistant Examiner*—Gregory Beaucage
*Attorney, Agent, or Firm*—Shlesinger, Arkwright, Garvey & Fado

[57] ABSTRACT

A method and apparatus for forming perforations in bar-shape articles, in which each said article is clamped, during its advancement in a direction transverse its own axis on a conveyor, by a respective actuator device and turned by this about its axis in such a way as to receive, along at least one circumference, a succession of laser pulses each forming a respective perforation.

12 Claims, 3 Drawing Figures ns discussed.
METHOD AND APPARATUS FOR FORMING PERFORATION IN BAR-SHAPE ARTICLES

BACKGROUND OF THE INVENTION

The present invention relates to a method for forming perforations in bar-shape articles using laser rays.

The present invention finds particularly advantageous application in the field of the production of smoking articles, in particular cigarettes, to which the following discussion will make specific reference without loss of generality thereby.

In the field of cigarette manufacture it is known to make so-called "ventilated" cigarettes, that is to say cigarettes having a plurality of holes in the region of the filter, for permitting the smoker to inhale, together with the smoke, a percentage of external air, with the double advantage of diluting the inhaled smoke and reducing the temperature, and, therefore, the content of harmful elements.

In the past, needle devices have been used to make ventilated cigarettes, the efficiency of which needle devices has become less and less with the increase in the productive capacity of cigarette making machines. In fact, if associated with a relatively high speed cigarette making machine the said needle devices wear out in a relatively short time thus causing frequent interruptions in the productive cycle.

For the reasons explained above the said needle devices have recently been replaced, when possible, by laser ray perforator devices which have been made in one of two different constructional arrangements. In the first of these two constructional arrangements mentioned above a pulsed beam of laser rays is emitted by a fixed laser generator and directed onto a cigarette to be pierced. This latter, during the piercing operation, is rolled between two facing surfaces in such a way as to turn on itself. Consequently, the holes formed on it are distributed in a substantially uniform manner along at least one circumference.

In the other of the two above mentioned constructional arrangements a laser generator of high power is used, which for piercing each cigarette emits a single beam which is broken down by fixed reflectors into a plurality of beams the number of which is equal to the number of holes to be formed. In this case the holes in each cigarette are made simultaneously without it being necessary to make it turn about its own axis.

Both of the above described known constructional arrangements have significant disadvantages which make their practical application problematical. In fact, the rolling of cigarettes required by the first said constructional arrangement is particularly damaging in that the cigarettes have immediately previously already been "softened" following a first rolling performed during the operations for connection of the filter, and the further rolling to perform the piercing certainly involves a partial emptying of the cigarettes. The second of the two above described constructional arrangements is, on the other hand, difficult to put into practice for purely economic reasons given the high power and therefore, the high cost of the laser generator which must be used.

SUMMARY OF THE INVENTION

The object of the present invention is that of providing a method for forming perforations in bar-shape articles, in particular cigarettes, which will be free from the above described disadvantages of the known constructional arrangements discussed.

The said object is achieved by the present invention in that it relates to a method for forming perforations in bar-shape articles, in particular cigarettes, characterised by the fact that it includes the steps of causing the said articles to move transversely of their axes along a determined path of advancement by means of a conveyor on which the said articles are spaced at a constant spacing coupling each said article to the said conveyor along at least part of the said path by means of retaining means including, for each said element, actuator means movable with the said conveyor and rotatable about its own axis for imparting to the said article, together with the said translation along the said path, a rotation about its axis; and utilising at least one laser generator unit for forming on each said article at least one ring of perforations during the said rotation thereof about its axis.

The present invention further relates to apparatus for performing the above defined method, the apparatus being characterised by the fact that it includes a conveyor for making the said articles move transversely of their axis along a determined path of advancement, the said conveyor being able to support the said articles with a constant spacing; retaining means for coupling each said article to the conveyor along at least part of the said path; the said retaining means including, for each said article, actuator means movable with the said conveyor and rotatable about its axis for imparting to the associated article, together with the said translation along the said path, a rotation about its axis; and at least one laser generator unit operable to form, on each said article, at least one ring of perforations during the said rotation thereof about its axis.

BRIEF DESCRIPTION OF THE DRAWINGS

Further characteristics and advantages of the present invention will become apparent from the following description with reference to the attached drawings, which illustrate a non limitative embodiment thereof, in which.

DETAILED DESCRIPTION OF THE INVENTION

Figure 1:
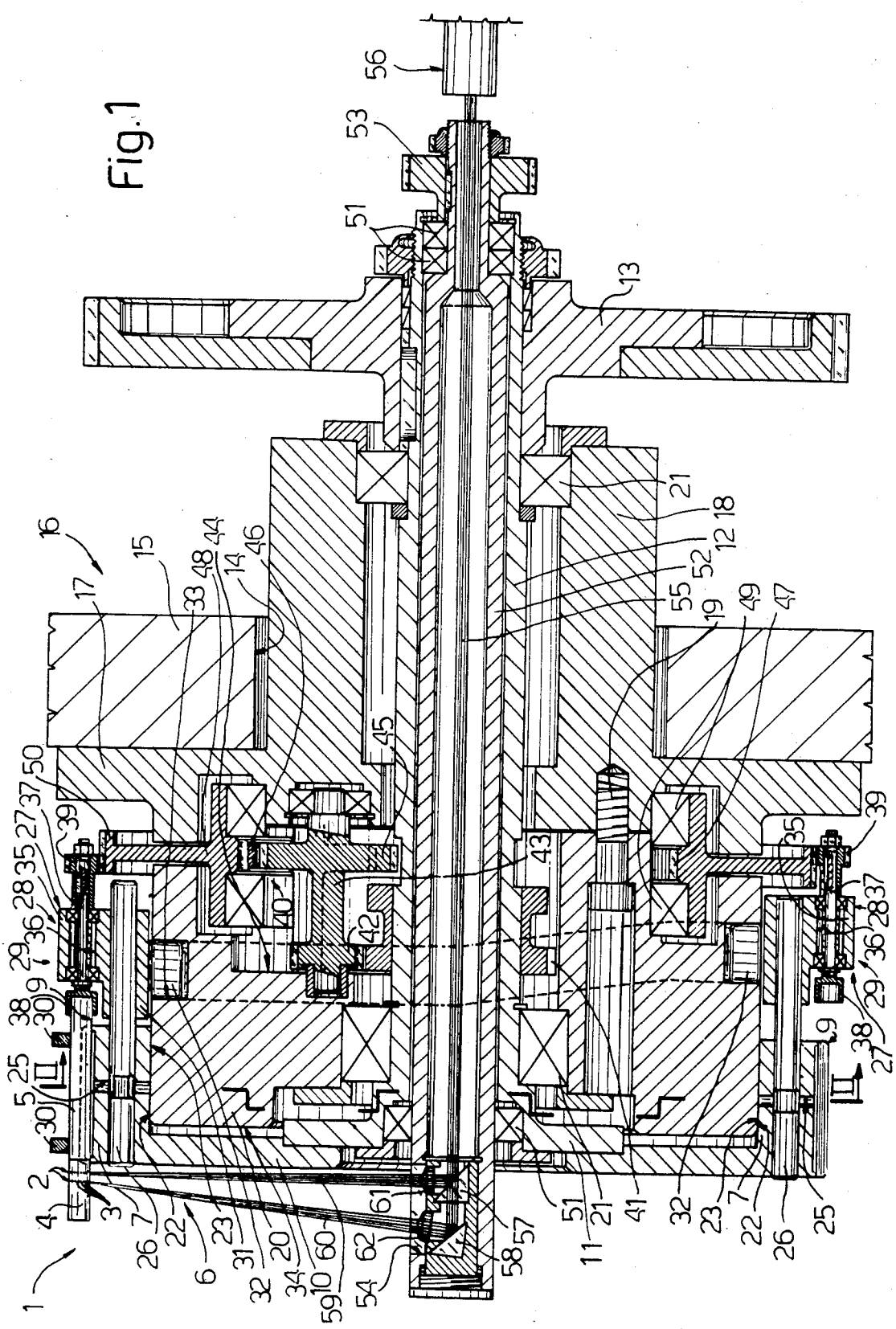
FIG. 1 schematically illustrates, in axial section, an embodiment of apparatus for the perforation of cigarettes according to the present invention.
Figure 3:
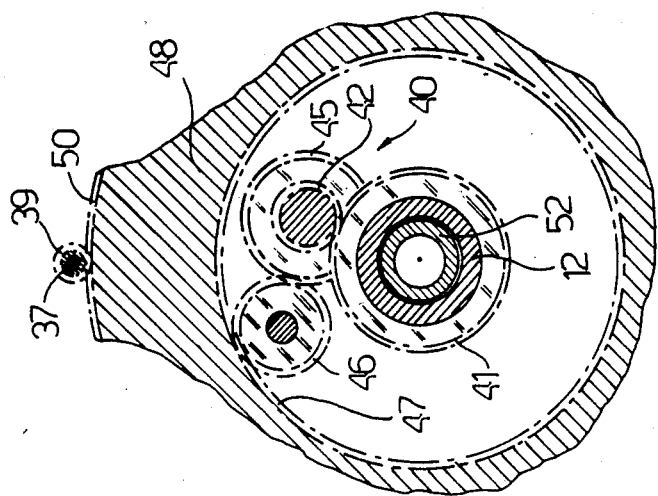
FIG. 3 schematically illustrates a front view, partially in section, of a detail of the apparatus of FIGS. 1 and 2.
Figure 2:
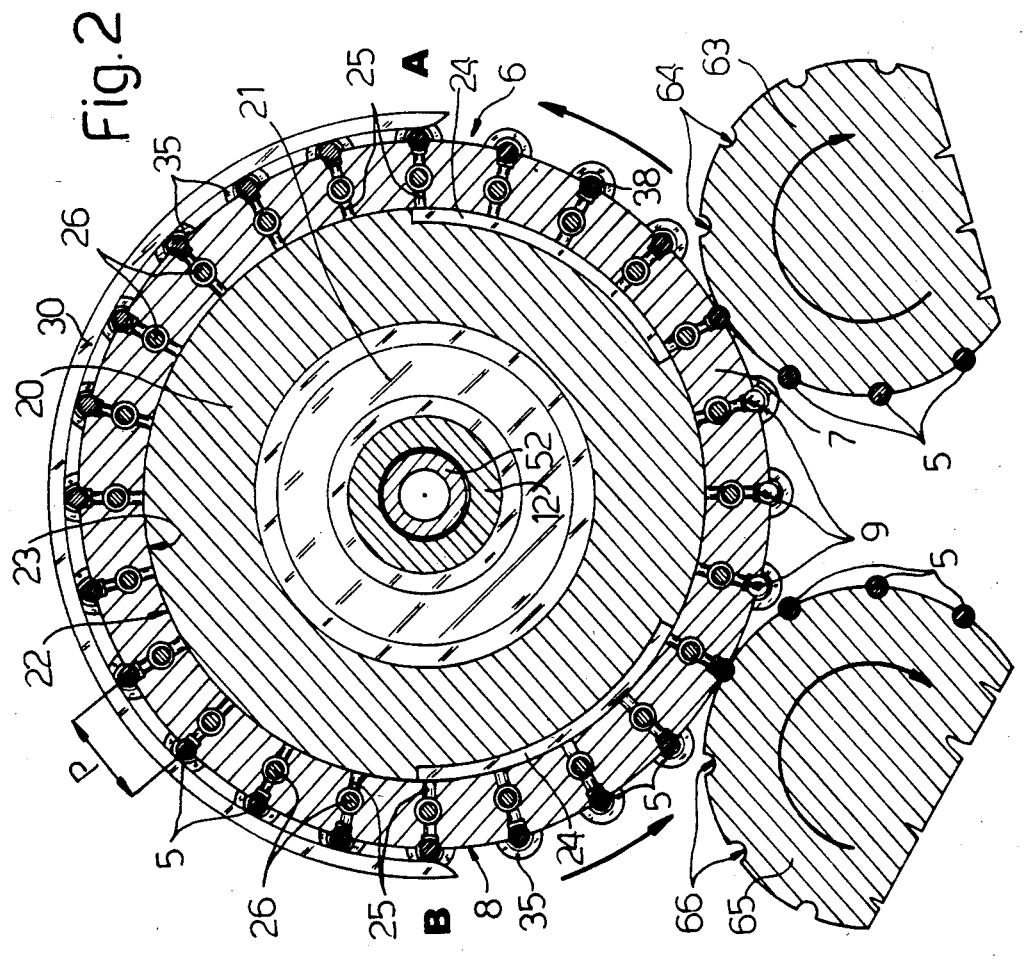
FIG. 2 is a section taken on the line II—II of FIG. 1, in which the said perforation apparatus is illustrated connected to input and output members of a filter fitting machine for cigarettes.

In FIG. 1 the reference numeral 1 generally indicates apparatus for the formation of two rings 2 of perforations 3 in the outer casing of filters 4 of cigarettes 5 advancing at substantially constant speed along a circular path by means of a conveyor 6. This latter includes an internally hollow roller 7 of cylindrical form which is provided on its outer surface 8 (FIG. 2) with a plurality of seats 9 arranged with a constant spacing 'P' and disposed parallel to the axis of the roller 7.

As illustrated in FIG. 1, the roller 7 is provided with an inner annular end flange 10 the inner periphery of which is rigidly connected to the outer periphery of an annular end flange 11 of a tubular shaft 12 coaxial with the roller 7. The shaft 12 extends through the roller 7 and supports, at its end opposite that connected to this latter, a toothed wheel 13 coupled in a manner not illustrated to a source of movement not illustrated. An intermediate portion of the shaft 12 extends through a hole 14 of a fixed wall 15 of a filter fitting machine generally indicated 16. To the outer surface of the wall 15 is connected a flange 17 of a tubular body 18 coaxial with the shaft 12 and extending through the hole 14 towards the toothed wheel 13. To the outer surface of the flange 17 is connected, by means of a plurality of axial screws 19, of which only one is illustrated in FIG. 1, a further tubular body 20 coaxial with the tubular body 18 and rotatably supporting, together with this latter, the shaft 12 by means of two bearings 21 the first engaged within the body 18 and the second within the body 20.

The tubular body 20 has a cylindrical outer surface 22 which is rotatably coupled with an air tight seal to an inner cylindrical surface 23 of the roller 7 and has a groove 24 disposed in a plane perpendicular to the axis of the shaft 12 and separated into two sections the arrangement of which, about the said axis, will be explained below. The groove 24 communicates on one side, in a manner not illustrated, with a suction source, and on the other, in a selective manner, with a plurality of substantially radially holes 25 extending inwardly from the bottom of each seat 9.

From the outer surface of the roller 7 facing the wall 15 extends, for each seat 9, an axial pin 26 aligned with the said associated seat 9 and serving as a prismatic sliding guide for an associated slide 27. This latter forms part of an actuator device 28 operable to act on the cigarette 5 housed in the associated seat 9 in a way which will be explained below and constituting, together with the other actuator devices 28, a retaining device generally indicated 29. The retaining device 29 further includes two arcuate guides 30 extending outwardly of the surface 8 along an arc the extension of which and position of which will be specified below.

Each slide 27 includes a tubular sleeve 31 slidably coupled and angularly fixed to the associated pin 26 and carrying a radial pin rotatably supporting a bearing 32. This latter is able to rotate in contact with the lateral walls of a groove 33 formed on the outer cylindrical surface 22 of the tubular body 20 and constituting with this latter a drum cam 34. The groove 33 is formed in such a way as to impart, during each revolution of the roller 7 about the axis of the shaft 12, a reciprocating displacement to each slide 27 between an advanced operative position illustrated in the upper part of FIG. 1 and a retracted rest position illustrated in the lower part of FIG. 1. For this purpose the groove 33 is formed in such a way as to maintain each slide 27 in the said operative position along an arc of displacement thereof the length of which will be defined below.

From each sleeve 31 extends, outwardly, in a direction opposite the bearing 32, a projection 35 traversed by a hole 36 coaxial with the associated seat 9 and rotatably housing a shaft 37. This latter carries, connected to its end facing the said seat 9, a resilient sleeve 38 the inner diameter of which is such as to permit a lightly forced coupling between the sleeve 38 and one end of an associated cigarette 5 housed within the associated seat 9. On the end of each shaft 37 opposite that carrying the sleeve 38 is keyed a toothed wheel 39 constituting an end gear of a cascade of gears 40 the other end gear of which, indicated 41, is keyed on the shaft 12. The gear cascade 40 includes a first toothed wheel 42 keyed on a shaft 43 rotatably supported at its ends by cylindrical bodies 18 and 20 and lodged within a cavity 44 defined between these latter. The shaft 43 carries keyed thereto a second toothed wheel 45 which, by means of a toothed wheel 46 supported in a manner not illustrated within the cavity 44, is coupled to the inner teeth 47 of a cylindrical ring 48 coaxial with the shaft 12 and supported within the tubular bodies 18 and 20 by bearings 49. To the outer surface of the ring 48 there is rigidly connected a toothed wheel 50 which is also coaxial with the shaft 12 and which is coupled to the toothed wheels 39 of all the shafts 37.

Through the shaft 12 there is rotatably mounted, by means of bearings 51, a tubular shaft 52 a first end of which projects from the shaft 12 on the toothed wheel 13 end and carries keyed thereto a toothed wheel 53 coupled to a source of movement not illustrated, and the other end of which projects from the flange 11 end of the shaft 12 and has an elongate axial slit 54. The shaft 52 can be traversed internally by a pulsed laser beam 55 at a frequency and with a law of emission which will be detailed below, from a laser generator 56 disposed facing the end of the shaft 52 carrying the toothed wheel 53. The beam 55 is deflected through the slit 54 out from the shaft 52 by means of two reflectors 57 and 58 aligned along the axis of the shaft 52 and the reflector 57 on which the beam 55 is first incident, is a semi-transparent mirror. The mirror 57 divides the beam 55 into two beams 59 and 60, which are focused by respective lenses 61 and 62 onto filters 4 in such a way as to form the holes 3 of the ring 2.

In use, the cigarettes 5 are supplied to the associated seats 9 on the roller 7 from a supply roller 63 which is substantially tangential to it and also has seats 64. Each of these latter, once it reaches the point of tangency with the roller 7, releases the associated cigarette 5 which engages an associated seat 9 and becomes retained in it by suction. This is true until each cigarette 5 reaches an arc AB hereinafter defined with the term "piercing arc" along which it is retained within the associated seat 9 by the guides 30. Consequently, the said first section of the groove 24 starts substantially in correspondence with the said point of tangency between the rollers 7 and 63 and terminates in correspondence with the beginning of the piercing arc AB in the sense of advancement of the cigarettes 5, whilst the other section of the groove 24 starts in correspondence with the end of the piercing arc AB and terminates in correspondence with a point of tangency between the roller 7 and an output roller 65. This latter carries the cigarettes 5 away from the seats 9 by suction, receiving them in respective axial seats 66.

When the cigarettes 5 are transferred to the roller 7 at the said point of tangency thereof with the roller 63, the slides 27 are located in their said retracted, rest position and are transferred by the effect of inclination of the groove 33 of the cam 34 to their advanced operative position substantially in correspondence with the beginning of the piercing arc AB. In every case, each slide 27 is axially displaced in such a way that the associated sleeve 38 achieves a positive engagement with the end of the associated cigarette 5 in correspondence with the cessation of the suction through the holes 25. During its advancement along the piercing arc AB, each slide 27 is maintained in a constant axial position by the groove 33 of the cam 34, which determines the disengagement of each sleeve 38 from the associated cigarette 5 upon renewing of the suction through the holes 25.

The transmission ratio of the gear cascade 40 is such that during the traverse of each cigarette 5 along the piercing arc AB it performs a complete revolution about its own axis by the effect of its coupling with the associated sleeve 38.

In the illustrated embodiment the tubular shaft 52 is made to turn with an angular velocity such that each complete revolution of the shaft 52 corresponds to the advancement by one spacing unit 'P' of the cigarettes 5. Further, the length of the piercing arc AB is equal to a number 'n' of spacing units 'P' where 'n' is the number of holes 3 of each ring 2.

Upon each revolution of the shaft 52 the generator 56 generates a series of 'n' laser pulses, which are emitted with a constant frequency during the time taken by the slit 54 to traverse the piercing arc AB. Consequently, upon each revolution of the shaft 52 the generator 56 forms a hole in 'n' cigarettes 5 successively distributed along the piercing arc AB. Each cigarette 5 is therefore struck during its displacement along the piercing arc AB 'n' times and therefore has, at the output thereof, two rings 2 of 'n' holes 3 which are uniformly distributed about the cigarette 5 because of the rotation of this latter about its axis by the effect of the coupling with the associated rotatable sleeve 38.

From the above explanation it will be seen that the angular velocity of the cigarettes 5 about their axes due to their coupling with the associated sleeves 38 is inversely proportional to the length of the piercing arc AB. Consequently, by increasing the diameter of the roller 7 it is possible to increase the length of the piercing arc AB, for example making it equal to up to '2n' spacing units. In this case the speed of rotation of the cigarettes 5 about their axes by the effect of their engagement with the sleeves 38 is reduced to half, whilst the speed of rotation of the shaft 52 will have to be varied in such a way that each complete revolution about its axis corresponds to an advance of the cigarettes 5 by two spacing units 'P'. Consequently, if the number of pulses emitted by the generator 56 remains constant and equal to 'n', at each revolution of the shaft 52 a cigarette 5 is struck by two, but each cigarette 5 will always have two rings 2 of 'n' holes 3 once it has traversed the piercing arc. Naturally, the principle of the invention remaining the same, there are numerous modifications which it would be possible to introduce to the piercing apparatus described above without by this departing from the scope of the present invention.

For example, in a first variant not illustrated, the mirrors 57 and 58 could have a different orientation from that described so as to be able to direct onto the cigarettes 5 respective focused beams coming from a generator disposed at any point within the space and not orientated along the axis of the shaft 52. Further, more reflecting mirrors could be utilised for the purpose of forming a corresponding number of rings 2 of holes 3 or else for reducing, if desired, the length of the piercing arc by forming, at each pulse, several holes in different cigarettes, this latter result could be achieved, in another variant not illustrated, by utilising several laser generators.

In a further variant not illustrated, which must be considered on its own or in combination with the above described variants, in combination with or instead of the sleeves 38 there are envisaged sleeves operable to engage the cigarettes 5 at the filter end with a law similar to that described for the sleeves 38. Finally, in a further variant not illustrated, the roller 7 is disposed facing a further roller 7 angularly connected thereto and provided with similar slides 27 for the purpose of determining the advancement of pairs of coaxial cigarettes connected together by a double filter extending across the space lying between the said two rollers 7 and subjected to the action of the laser generator 56. This latter will obviously be able to form two spaced pairs of rings of holes on the said double filter.

Obviously, in all the above mentioned variants, the rings 2 of holes can be reduced to a single row by removing one of the mirrors 57 or 58.

I claim:

1. A method for forming holes in bar-shaped articles, in particular cigarettes, comprising the steps of:
   (a) causing said articles (5) to translate transversely of their axes along a predetermined path of advancement by means of a conveyor (6) on which said articles (5) are uniformly spaced with a spacing (P) which remains constant along the whole length of said path of advancement;
   (b) coupling each said article (5) to said conveyor (6) by means of first retaining means (24) fixing said articles to said conveyor along at least an initial and a final portion of said path;
   (c) engaging each said article, along at least an intermediate portion of said path, with second retaining means (29) comprising; for each said article (5), actuator means (28) which moves with said conveyor (6), is arranged at a fixed position relative thereto, and rotates relative to said conveyor (6) about the axis of the associated article to impart thereto a rotation about its axis together with said translation along said path; and
   (d) forming about each said article, and during the advancement thereof along said intermediate portion of said path, at least one ring (2) of perforations (3) by means of at least one laser generator unit (56).

2. The method according to claim 1, including the steps of:
   (a) rotating the conveyor and comprises a large roller (7) about its axis, and along the periphery of which said articles (5) are distributed with said constant spacing (P); said path extending along the periphery of said roller (7), actuating the laser generator unit (56) whilst is advances along a piercing arc (AB) extending along said intermediate portion of said path, and each said actuator means (28) causing the associated article to perform a complete revolution about its axis during the time in which said associated article advances along said piercing arc.

3. The method according to claim 2, including the steps of:
   (a) generating at least one pulsed laser beam from the laser generating unit (56) which is selectively directed onto a portion (4) to be pierced of each said article (5) by at least one reflector (57,58) rotating about the axis of said roller (7) to perform a complete revolution about said axis during the time taken by said roller (7) to advance each said article by a distance equal to said spacing (P).

4. The method according to claim 1, including the steps of:
   (a) forming perforations on each said article (5) whilst the article itself advances along a piercing arc (AB) extending along said intermediate portion of said path and having a length equal to n times the length of said spacing (P), where n is the number of perforations (3) of each said ring (2) of perforations on each said article (5).

5. Apparatus for forming perforations in bar-shaped articles, in particular cigarettes, comprising a conveyor (6) to translate said articles (5) transversely of their axes and along a predetermined path of advancement; a plurality of seats (9) spaced along said conveyor (6) with a spacing (P) which remains constant along the whole length of said path, each said seat (9) accommodating, in use, a respective said article (5); first retaining means (24) arranged at said seats (9) to fix each said article (5) to said conveyor (6) and within the respective said seat (9) along at least an initial and a final portion of said path; second retaining means (29) operable to engage each said article (5) along an intermediate portion of said path to hold such said article (5) within said respective seat (9), said second retaining means (29) comprising, for each said article (5), first actuator means (28) connected to said conveyor (6) for movement therewith and aligned with a respective said seat (9), each said first actuator means (28) being rotatable about the axis of the associated article (5) to impart thereto a rotation about its axis relative to the respective seat (9) together with said translation along said path; and at least a laser generator unit (59) to form, about each said article (5), at least one ring (2) of perforations (3) during advancement of said article (5) along said intermediate portion of said path.

6. Apparatus as claimed in claim 5 wherein said conveyor (6) comprises a rotatable roller (7), about the periphery of which said seats (9) are provided, said path extending along the periphery of said roller (7), said laser generator unit (56) being operable to perforate each said article (5) whilst it advances along a piercing arc (AB) extending along said intermediate portion of said path, and each said actuator means (28) being operable to cause the associated article to perform a complete revolution about its axis and within the respective said seat (9) during the time in which the associated article (5) moves along said piercing arc (AB).

7. Apparatus as claimed in claim 6, wherein said laser generator unit (56) comprises a generator for producing at least one pulsed beam (55) of laser rays and a reflector (57,58) for selectively directing said beam (55) onto a portion (4) to be pierced of each said article (5); said reflector (57,58) being mounted for rotation about the axis of rotation of said roller (7), and second actuator means (53) being provided for causing said reflector (57,58) to perform a complete revolution about the axis of rotation of said roller (7) during the time taken by said roller (7) to advance each said article (5) by a distance equal to said spacing (P).

8. Apparatus as claimed in claim 6 wherein said piercing arc (AB) has a length equal to n times the length of said spacing (P), where n is the number of perforations (3) of each said ring (2) of perforations on each said article (5).

9. Apparatus as claimed in claim 6, wherein said piercing arc (AB) has a length equal to n times the length of said spacing (P), where n is a multiple of the number of perforations (3) of each said ring (2) of perforations on each said article (5).

10. Apparatus as claimed in claim 5, wherein said first actuator means (28) comprise, for each said article (5), at least one sleeve (38) coaxial with the respective said seat (9) and operable to engage a respective end portion of said article (5), third actuator means (13,40) being coupled to each said sleeve (38) for rotating the same about its own axis.

11. Apparatus as claimed in claim 10, wherein said conveyor (6) comprises a rotatable central shaft (12) and a roller (7) keyed on said shaft (12) for rotation therewith, said seats (9) being provided along the periphery of said roller (7), and said third actuator means (13,40) comprising, for each said sleeve (38), a gear cascade (40), a first end gear (41) of which is keyed on said shaft (12), each said sleeve (38) being provided with a coaxial shaft (37) rigidly connected thereto, and a second end gear (39) of said gear cascase (40), being keyed on said shaft (39) rigid with the respective sleeve (38).

12. Apparatus as claimed in claim 10, wherein said third actuator means (13,40) further comprise, for each said sleve (38), a slide (27) mounted on said roller (7) for movement along the axis of the associated article (5), and cam means (34) to move said slide (27) towards and away from a facing end portion of said article (5), and to maintain said sleeve (38) in engagement with said facing end portion during advancement of said article (5) along said intermediate portion of said path.

* * * * *